C. D. DAVIS.
CALF FEEDER.
APPLICATION FILED MAY 7, 1912.
1,074,313.
Patented Sept. 30, 1913.
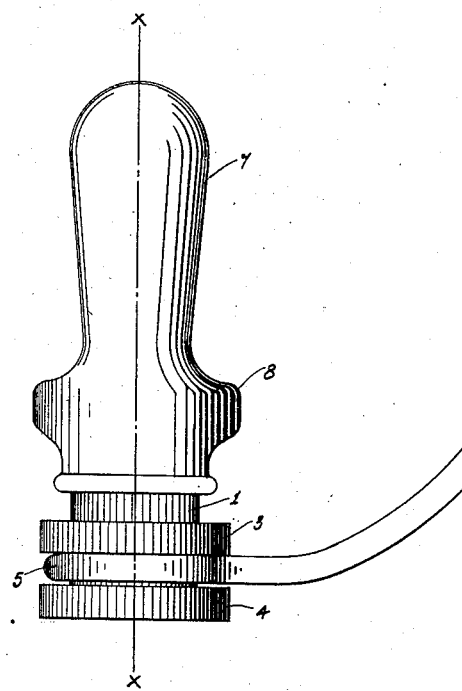
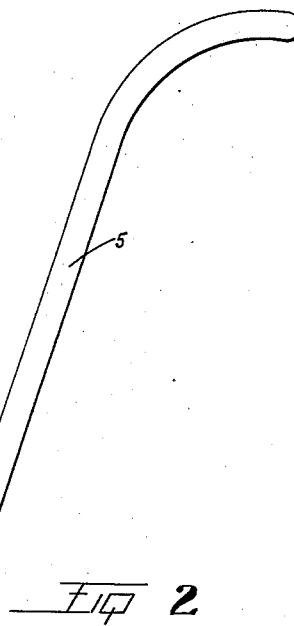
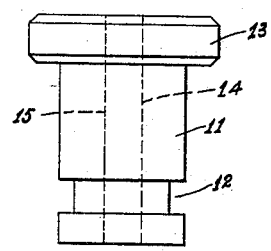
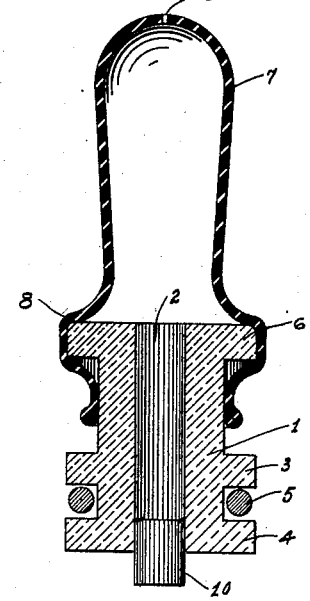
Witnesses
Clarence Smith
J. B. Webster
Inventor
Chas. D. Davis
Percy S. Webster
Attorney

UNITED STATES PATENT OFFICE.

CHARLES D. DAVIS, OF SACRAMENTO, CALIFORNIA.

CALF-FEEDER.

1,074,313.

Specification of Letters Patent.

Patented Sept. 30, 1913.

Application filed May 7, 1912. Serial No. 695,612.

*To all whom it may concern:*

Be it known that I, CHARLES D. DAVIS, a citizen of the United States, residing at Sacramento, in the county of Sacramento, State of California, have invented certain new and useful Improvements in Calf-Feeders; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in farm paraphernalia and particularly to devices used for teaching calves to drink milk from a bucket or other receptacle for the purpose of weaning them from their mothers, the object of the invention being to produce a nipple by the use of which the calf can be made to drink from a bucket or other receptacle through said nipple and the nipple can then be closed causing the calf to drink from the bucket or other receptacle entirely and hence the use of the nipple can be gradually discontinued.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings similar characters of reference indicate corresponding parts in the several views.

Figure 1 is a side elevation of the complete device. Fig. 2 is a sectional view taken on a line X—X of Fig. 1. Fig. 3 is a view showing a modified form of body portion for the nipple structure.

Referring now more particularly to the characters of reference on the drawings, the numeral 1 designates a body member provided with a central orifice 2. On the lower end of such body member is a pair of spaced flanges 3 and 4 forming an intermediate groove into which is secured a handle member 5, which handle member projects upwardly in any desired curve to form a substantial support for the said body member 1. At the upper end of said body member 1 is a flange 6 adapted to receive an enlarged portion 8 of a nipple 7, which nipple is made of rubber or any other suitable composition or material desired and is provided with the usual hole 9.

In practice the nipple 7 is tendered to the calf which will readily take the same into its mouth and then the member 5 is used to pull the calf's mouth down into the bucket or other receptacle and then by sucking on the nipple 7 the calf will draw a little from the bucket or receptacle up through the orifice 2 and hole 9. After the calf has sucked awhile in this manner, the cork 10 is inserted in the bottom of the orifice 2 which then shuts off the flow of milk through the orifice 2 and the hole 9 and the calf will then draw the milk into its mouth and around said nipple directly from said bucket or receptacle and hence the nipple 7 may be withdrawn from its mouth entirely, leaving it to drink the milk without the nipple, thus attaining the object of the invention as set forth herein.

In practice the member 1 and its parts will be made preferably of glass but if desired a metal casting or other material may be used and then in that event the structure would be of the shape shown in Fig. 3, wherein 11 designates the body, 12 a slot cut in the body to receive the handle member and 13 the flange to receive the nipple, there being a central orifice 14 for the same purpose as the orifice 2.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described comprising the combination of a body member provided with a central orifice, a pair of spaced flanges on the lower end of said body member, a handle member projecting between said flanges, a flange on the upper end of said body member, a nipple adapted to project over said last named flange, and a cork adapted to be inserted in said orifice, as described.

2. A device of the character described comprising the combination of a body member provided with a central orifice, a pair of spaced flanges on the lower end of said body member, a handle member projecting between said flanges, a flange on the upper end of said body member, and a nipple adapted to project over said last named flange, as described.

In testimony whereof I affix my signature in presence of two witnesses.

CHARLES D. DAVIS.

Witnesses:
  STEPHEN N. BLEWETT,
  CLARENCE SMITH.

Copies of this patent may be obtained for five cents each, by addressing the "Commissioner of Patents, Washington, D. C."